United States Patent
Wu et al.

(10) Patent No.: US 12,476,271 B2
(45) Date of Patent: Nov. 18, 2025

(54) CELL FEEDING SYSTEM AND METHOD, CELL GROUPING SYSTEM AND METHOD, AND OPERATION SYSTEM

(71) Applicant: CONTEMPORARY AMPEREX TECHNOLOGY (HONG KONG) LIMITED, Hong Kong (CN)

(72) Inventors: Kai Wu, Ningde (CN); Jian Luo, Ningde (CN); Yuhang Ma, Ningde (CN); Ying Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/209,930

(22) Filed: May 16, 2025

(65) Prior Publication Data
US 2025/0279458 A1    Sep. 4, 2025

Related U.S. Application Data

(63) Continuation of application No. PCT/CN2023/139890, filed on Dec. 19, 2023.

(30) Foreign Application Priority Data

Oct. 13, 2023    (CN) .......................... 202311322812.3

(51) Int. Cl.
*H01M 10/04*    (2006.01)
*B65G 47/90*    (2006.01)
*H01M 10/42*    (2006.01)

(52) U.S. Cl.
CPC ........ *H01M 10/0404* (2013.01); *B65G 47/90* (2013.01); *H01M 10/0481* (2013.01); *H01M 10/4285* (2013.01)

(58) Field of Classification Search
CPC ............ H01M 10/04; H01M 10/0404; H01M 10/0481; H01M 10/4285; B65G 47/90
See application file for complete search history.

(56) References Cited

U.S. PATENT DOCUMENTS

2022/0416286 A1* 12/2022 Park ................. H01M 10/0404

FOREIGN PATENT DOCUMENTS

| CN | 108963313 A | 12/2018 |
| CN | 109378493 A | 2/2019 |

(Continued)

OTHER PUBLICATIONS

International Search Report and Written Opinion mailed on Jul. 7, 2024, received for PCT Application PCT/CN2023/139890, filed on Dec. 19, 2023, 15 pages including English Translation.

(Continued)

*Primary Examiner* — Karie O'Neill Apicella
(74) *Attorney, Agent, or Firm* — XSENSUS LLP

(57) ABSTRACT

A cell feeding method includes: controlling a first conveyor line to convey inflowing cells to a first material fetching position; controlling a second conveyor line to convey inflowing cells to a second material fetching position; controlling a third conveyor line to convey inflowing cells to a side taping station, and conveying the cells subjected to side taping treatment to a third material fetching position; controlling a first feeding and grabbing mechanism to grab a first number of cells from a first material fetching position to a first feeding area in the feeder position; and controlling a second feeding and grabbing mechanism to grab a first number of cells from a target material fetching position to a second feeding area in the feeder position.

20 Claims, 8 Drawing Sheets

(56) References Cited

FOREIGN PATENT DOCUMENTS

| | | |
|---|---|---|
| CN | 114243082 A | 3/2022 |
| CN | 216698464 U | 6/2022 |
| CN | 218144519 U | 12/2022 |
| CN | 115832406 A | 3/2023 |
| CN | 116093405 A | 5/2023 |
| CN | 117068678 A | 11/2023 |
| KR | 10-2008-0025865 A | 3/2008 |
| WO | 2019/215089 A1 | 11/2019 |

OTHER PUBLICATIONS

Notification to Grant Patent Right for Invention of the Chinese application No. 202311322812.3, issued on Nov. 24, 2023, 7 pages with English translation.

* cited by examiner

CELL FEEDING SYSTEM AND METHOD, CELL GROUPING SYSTEM AND METHOD, AND OPERATION SYSTEM

CROSS-REFERENCE TO RELATED APPLICATIONS

This disclosure is a continuation of International Application No. PCT/CN2023/139890, filed Dec. 19, 2023, which is based on and claims priority to the Chinese Patent Application No. 202311322812.3, filed on Oct. 13, 2023 and entitled "CELL FEEDING SYSTEM AND METHOD, CELL GROUPING SYSTEM AND METHOD, AND OPERATION SYSTEM", each are incorporated herein by reference in its entirety.

TECHNICAL FIELD

This disclosure relates to, but is not limited to, the technical field of battery production, and in particular, to a cell feeding system and method, a cell grouping system and method, and an operation system.

BACKGROUND

New energy batteries are increasingly widely used in life and industry. For example, new energy vehicles equipped with batteries have been widely used. In addition, batteries are increasingly used in the field of energy storage, and the like.

In the production of battery products, a plurality of cells can be assembled into a battery module, and a plurality of battery modules can be assembled into a battery pack. The battery module may include a single-row module and a double-row module. Some models of battery pack may include a mixture of single-row modules and double-row modules. However, in the related art, the process of assembling battery modules cannot realize the collinear production of single-/double-row modules, resulting in low production efficiency.

SUMMARY

In view of this, embodiments of this disclosure at least provide a cell feeding system and method, a cell grouping system and method, and an operation system, which can compatibly provide cells adapted to different types of modules as assembly materials, thus providing support for assembly automatically compatible with single-/double-row modules, improving production efficiency, simplifying control logic of the system, saving module storage space, and improving space utilization.

The technical solutions of the embodiments of this disclosure are implemented as follows:

An embodiment of this disclosure provides a cell feeding system including a conveyance device and a feeding and grabbing device, where the conveyance device includes a first conveyor line, a second conveyor line and a third conveyor line, and the feeding and grabbing device includes a first feeding and grabbing mechanism and a second feeding and grabbing mechanism; where the first conveyor line is configured to convey inflowing cells to a first material fetching position;
the second conveyor line is configured to convey inflowing cells to a second material fetching position;
the third conveyor line is configured to convey inflowing cells to a side taping station for side taping treatment, and convey the cells subjected to the side taping treatment to a third material fetching position;
the first feeding and grabbing mechanism is configured to grab a first number of cells from the first material fetching position to a first feeding area in a feeder position; and
the second feeding and grabbing mechanism is configured to grab the first number of cells from a target material fetching position to a second feeding area in the feeder position; where
the target material fetching position is selected from the second material fetching position and the third material fetching position based on a type of a current module to be assembled, and the cells in the first feeding area and the cells in the second feeding area are configured to be grouped in one-to-one correspondence to obtain a first number of cell groups, the cell group including two cells with side surfaces opposite each other.

In the cell feeding system in this embodiment of this disclosure, the first feeding and grabbing mechanism grabs the first number of cells from the first material fetching position to the first feeding area in the feeder position, and the second feeding and grabbing mechanism grabs the first number of cells from the target material fetching position to the second feeding area in the feeder position, where the target material fetching position is selected from the second material fetching position and the third material fetching position based on the type of the current module to be assembled. The cells to be grabbed from the first material fetching position and the second material fetching position are not subjected to side taping treatment, and the cells to be grabbed from the third material fetching position are subjected to side taping treatment. Therefore, in a case that the cells are grabbed from the first material fetching position and the second material fetching position, the cells on the first feeding area and the cells on the second feeding area can be grouped in one-to-one correspondence to obtain the cell groups with the cells not affixed, so as to assemble the single-row module. In a case that the cells are grabbed from the first material fetching position and the third material fetching position, the cells on the first feeding area and the cells on the third feeding area can be grouped in one-to-one correspondence to form the cell groups with cells affixed, so as to assemble the double-row module. In this way, based on the type of the current module to be assembled, the cells can be grabbed from the corresponding material fetching position to the second feeding area in the feeder position, so as to compatibly provide the suitable cells as assembly materials for different types of modules, and further provide support for assembly automatically compatible with single-/double-row modules, thereby improving the production efficiency and simplifying the control logic of the system. In addition, in a scenario of assembling a battery pack including a mixture of the single-row modules and the double-row modules, the assembly automatically compatible with single-/double-row modules can be supported, so there is no need to switch module types for production in the process of producing the battery pack. In this way, compared with the solution of first assembling a required number of battery modules of one type and then assembling battery modules of another type, this embodiment of this disclosure can save module storage space and improve space utilization.

In some embodiments, under the condition that the type of the current module to be assembled is single-row module, the second material fetching position is the target material fetching position; and under the condition that the type of the current module to be assembled is double-row module, the third material fetching position is the target material fetching position.

In this way, under the condition of assembling a single-row module, the first number of cells are grabbed from the second material fetching position to the second feeding area in the feeder position to obtain the cell groups with cells not affixed; and under the condition of assembling a double-row module, the first number of cells are grabbed from the third material fetching position to the second feeding area in the feeder position to obtain the cell groups with cells affixed together. In this way, the suitable cells can be compatibly provided as assembly materials for single-row modules or double-row modules, thus facilitating the simple and efficient collinear production of single-/double-row modules.

In some embodiments, the conveyance device further includes a fourth conveyor line, a fifth conveyor line, and a shunt mechanism; where an output end of the fourth conveyor line is connected to an input end of the first conveyor line; an output end of the fifth conveyor line is connected to the shunt mechanism; and the shunt mechanism is configured to shunt the cells on the fifth conveyor line to the second conveyor line and/or the third conveyor line based on a quantity ratio of single-row modules to double-row modules in at least one module to be assembled.

In this way, based on the quantity ratio of single-row modules to double-row modules in at least one module to be assembled, the shunt mechanism can be used to shunt the cells flowing from the upstream to the second conveyor line and/or the third conveyor line, so as to provide corresponding cells as assembly materials for assembling the single-row modules and double-row modules corresponding to the quantity ratio.

In some embodiments, the cell feeding system further includes a taping mechanism, and the taping mechanism is configured to conduct side taping treatment for the cells on the third conveyor line in the side taping station.

In this way, the cells on the third conveyor line are subjected to side taping treatment conducted by the taping mechanism, so that the cells for grabbing in the third material fetching position are all subjected to side taping treatment, and can be grouped with the cells for grabbing in the first material fetching position to obtain the cell groups with cells affixed.

In some embodiments, the cell feeding system further includes a detection mechanism configured to detect the side taping of the cell on the third conveyor line in a detection station to obtain a detection result of the cell; and the third conveyor line is further configured to convey the detected cell to the third material fetching position under the condition that the detection result indicates that the cell is normally taped.

In this way, the third conveyor line also conveys the cell to flow through the detection station before conveying the cell to the third material fetching position, so as to conduct side taping detection on the cell, thereby improving the accuracy of cell taping in the third material fetching position, and further improving the yield of battery products.

An embodiment of this disclosure provides a cell grouping system, including:
the foregoing cell feeding system configured to separately feed a first number of cells to the first feeding area and second feeding area of the feeder position; and
a cell grouping device configured to group the cells in the first feeding area and the cells in the second feeding area in one-to-one correspondence to obtain a first number of cell groups, where the cell group includes two cells with side surfaces opposite each other.

The cell grouping system in this embodiment of this disclosure, based on the cell feeding system, can compatibly provide cells adapted to different types of the module as assembly materials, and form corresponding cell groups, thus providing support for assembly automatically compatible with compatible single-/double-row modules, improving production efficiency, simplifying control logic of the system, saving module storage space, and improving space utilization.

In some embodiments, the cell grouping device includes a cell grouping mechanism and a pressurizing mechanism, and the cell grouping mechanism includes a turntable and a plurality of carrier assemblies distributed on the turntable; the turntable is configured to drive, through rotation, each carrier assembly to pass through the feeder position, a pressurizing position, and an unloading position in turn; under the condition that the carrier assembly moves to the feeder position, a first carrier area of the carrier assembly serves as the first feeding area, and a second carrier area of the carrier assembly serves as the second feeding area; and the pressurizing mechanism is located in the pressurizing position, and is configured to, under the condition that the carrier assembly moves to the pressurizing position, laterally pressurize the cells in the first carrier area of the carrier assembly and the cells in the second carrier area of the carrier assembly, so as to bring the cells in the first carrier area of the carrier assembly and the cells in the second carrier area of the carrier assembly closer to each other in one-to-one correspondence, thereby forming the first number of cell groups.

In this way, through the rotation of the turntable, the plurality of carrier assemblies are driven to pass through the feeder position, the pressurizing position, and the unloading position in turn, so that cell feeding, cell pressurizing and grouping, and cell group unloading can be supported in parallel, thereby reducing production time and improving production efficiency.

In some embodiments, the cell grouping system further includes an unloading and grabbing device configured to grab the cell groups from the carrier assembly to a cell group storage position under the condition that the carrier assembly moves to the unloading position.

In this way, an unloading operation of the cell groups can be accurately and efficiently completed by the unloading and grabbing device.

In some embodiments, the unloading position includes a first unloading position and a second unloading position, and the turntable is configured to drive, through rotation, each carrier assembly to pass through the feeder position, the pressurizing position, the first unloading position, and the second unloading position in turn. The unloading and grabbing device includes: a first unloading and grabbing mechanism, configured to grab the cell group in a first carrier position of the carrier assembly to the cell group storage position under the condition that the carrier assembly moves to the first unloading position; and a second unloading and grabbing mechanism, configured to grab the cell groups located in a second carrier position of the carrier assembly to the cell group storage position under the condition that the carrier assembly moves to the second unloading position. The first carrier position and the second carrier position in the carrier assembly are alternately distributed along an arrangement direction of the cell groups.

In this way, the cell groups in the carrier assembly can be quickly unloaded to the cell storage position by disposing the first unloading position and the second unloading position and using the first unloading and grabbing mechanism and the second unloading and grabbing mechanism to grab the grouped cell groups from the first unloading position and the second unloading position respectively, thereby improving the production efficiency of module assembly. In addition, the first carrier position and the second carrier position in the carrier assembly are alternately distributed, so a larger operation space can be provided for the first unloading and grabbing mechanism and the second unloading and grabbing mechanism, thereby reducing the space limitations and lowering the control difficulty.

An embodiment of this disclosure provides an operation system for module assembly, including one of the following: the foregoing cell feeding system; and the foregoing cell grouping system.

The operation system for assembly module in the embodiment of this disclosure can compatibly provide suitable cells as assembly materials for different types of modules, thus providing support for assembly automatically compatible with single-/double-row modules, improving production efficiency, simplifying control logic of the system, saving module storage space, and improving space utilization.

An embodiment of this disclosure provides a cell feeding method. The method includes:
  controlling a first conveyor line to convey cells flowing into the first conveyor line to a first material fetching position;
  controlling a second conveyor line to convey cells flowing into the second conveyor line to a second material fetching position;
  controlling a third conveyor line to convey cells flowing into the third conveyor line to a side taping station for side taping treatment, and conveying the cells subjected to side taping treatment to a third material fetching position;
  controlling a first feeding and grabbing mechanism to grab a first number of cells from the first material fetching position to a first feeding area in a feeder position; and
  controlling a second feeding and grabbing mechanism to grab the first number of cells from a target material fetching position to a second feeding area in the feeder position; where
  the target material fetching position is selected from the second material fetching position and the third material fetching position based on a type of a current module to be assembled, and the cells in the first feeding area and the cells in the second feeding area are configured to be grouped in one-to-one correspondence to obtain a first number of cell groups, the cell group including two cells with side surfaces opposite each other.

The cell feeding method in this embodiment of this disclosure can compatibly provide suitable cells as assembly materials for different types of modules, thus providing support for assembly automatically compatible with single-/double-row modules, improving production efficiency, simplifying control logic of the system, saving module storage space, and improving space utilization.

In some embodiments, before the controlling a second feeding and grabbing mechanism to grab a first number of cells from a target material fetching position to a second feeding area in the feeder position, the cell feeding method further includes the following step: selecting, based on the type of the current module to be assembled, the target material fetching position from the second material fetching position or the third material fetching position.

In this way, the target material fetching position corresponding to the type of the current module to be assembled can be automatically and quickly determined.

In some embodiments, the selecting, based on the type of the current module to be assembled, the target material fetching position from the second material fetching position or the third material fetching position includes one of the following: selecting the second material fetching position as the target material fetching position under the condition that the type of the current module to be assembled is single-row module; and selecting the third material fetching position as the target material fetching position under the condition that the type of the current module to be assembled is double-row module.

In this way, under the condition of assembling a single-row module, the first number of cells are grabbed from the second material fetching position to the second feeding area in the feeder position to obtain the cell groups with cells not affixed; and under the condition of assembling a double-row module, the first number of cells are grabbed from the third material fetching position to the second feeding area in the feeder position to obtain the cell groups with cells affixed together. In this way, the suitable cells can be compatibly provided for single-row modules or double-row modules as assembly materials, thus facilitating the simple and efficient collinear production of single-/double-row modules.

In some embodiments, the cell feeding method further includes: controlling a fourth conveyor line to sequentially convey cells on the fourth conveyor line to the first conveyor line; determining a quantity ratio of single-row modules to double-row modules in at least one module to be assembled; and based on the quantity ratio, controlling a shunt mechanism to shunt cells on a fifth conveyor line to the second conveyor line and/or the third conveyor line.

In this way, based on the quantity ratio of single-row modules to double-row modules in the at least one module to be assembled, the shunt mechanism can be controlled to shunt the cells flowing from the upstream to the second conveyor line and/or the third conveyor line, so as to provide corresponding cells as assembly materials for assembling the single-row module and the double-row module corresponding to the quantity ratio.

In some embodiments, the controlling, based on the quantity ratio, a shunt mechanism to shunt cells on a fifth conveyor line to the second conveyor line and/or the third conveyor line includes: determining an assembly sequence of the at least one module based on the quantity ratio; traversing the at least one module according to the assembly sequence, and performing the following operations on each module in the traversal process: selecting a second target conveyor line from the second conveyor line and the third conveyor line based on a type of the module; and controlling the shunt mechanism to flow a second number of cells on the fifth conveyor line into the second target conveyor line, where the second number is the number of cell groups to be grouped corresponding to the module.

In this way, the cells on the fifth conveyor line can be quickly and accurately shunted to the second conveyor line and/or the third conveyor line according to the assembly sequence corresponding to the quantity ratio of single-row modules to double-row modules in at least one module to be assembled.

In some embodiments, the cell feeding method further includes: sequentially determining, according to the assembly sequence, the at least one module as the current module to be assembled.

In this way, according to a unified assembly sequence, the shunt mechanism can be controlled to shunt the cells and the second feeding and grabbing mechanism can grab the cells, thus improving the accuracy of module assembly.

In some embodiments, the cell feeding method further includes: in a case of an abnormal module with abnormal assembly, inserting a new module with the same model as the abnormal module into at least one module to be traversed in the traversal process.

In this way, in the case of abnormal module assembly, new cells can be replenished in time for assembling new modules, thereby improving the fault tolerance of module assembly and reducing the waiting time for replenishing materials.

In some embodiments, the cell feeding method further includes: controlling the third conveyor line to convey the cells flowing into the third conveyor line to the side taping station; controlling a taping mechanism in the side taping station to conduct side taping treatment for the cells on the third conveyor line; and controlling the third conveyor line to convey the cells subjected to the side taping treatment to the third material fetching position.

In this way, the cells on the third conveyor line are subjected to side taping treatment, so that the cells for grabbing in the third material fetching position are all subjected to side taping treatment, and can be grouped with the cells for grabbing in the first material fetching position to obtain the cell groups with cells affixed.

In some embodiments, the controlling the third conveyor line to convey the cells subjected to the side taping treatment to the third material fetching position includes: controlling the third conveyor line to convey the cells subjected to side taping treatment to a detection station; controlling a detection mechanism in the detection station to conduct side taping detection on the cell on the third conveyor line to obtain a detection result of the cell; and under the condition that the detection result indicates that the cell is normally taped, controlling the third conveyor line to convey the detected cell to the third material fetching position.

In this way, the third conveyor line also conveys the cell to flow through the detection station before conveying the cell to the third material fetching position, so as to conduct side taping detection on the cell, thereby improving the accuracy of cell taping in the third material fetching position, and further improving the yield of battery products.

An embodiment of the disclosure provides a cell grouping method. The method includes:
  separately feeding a first number of cells to a first feeding area and a second feeding area of a feeder position by using the foregoing cell feeding method;
  controlling a cell grouping device to group the cells in the first feeding area and the cells in the second feeding area in one-to-one correspondence to obtain a first number of cell groups, where the cell group includes two cells with side surfaces opposite each other.

The cell grouping method in this embodiment of this disclosure can compatibly provide suitable cells as assembly materials for different types of modules to form corresponding cell groups, thereby providing support for assembly automatically compatible with single-/double-row modules, improving production efficiency, simplifying control logic of the system, saving module storage space, and improving space utilization.

In some embodiments, the cell grouping device includes a cell grouping mechanism and a pressurizing mechanism, where the cell grouping mechanism includes a turntable and a plurality of carrier assemblies distributed on the turntable, and the turntable is configured to drive, through rotation, each carrier assembly to pass through the feeder position, a pressurizing position, and an unloading position in turn; and the pressurizing mechanism is located in the pressurizing position. Before the separately feeding a first number of cells to a first feeding area and a second feeding area of a feeder position, the method further includes: controlling the turntable to rotate to drive a first carrier assembly located at the unloading position to move to the feeder position, and taking a first carrier area of the first carrier assembly as the first feeding area and a second carrier area of the first carrier assembly as the second feeding area. The controlling a cell grouping device to group the cells in the first feeding area and the cells in the second feeding area in one-to-one correspondence to obtain a first number of cell groups includes: controlling the turntable to rotate to drive the first carrier assembly to move from the feeder position to the pressurizing position; and under the condition that the first carrier assembly moves to the pressurizing position, controlling the pressurizing mechanism to laterally pressurize the cells in the first carrier area of the first carrier assembly and the cells in the second carrier area of the first carrier assembly, so as to bring the cells in the first carrier area of the first carrier assembly and the cells in the second carrier area of the first carrier assembly closer to each other in one-to-one correspondence, thereby forming the first number of cell groups.

In this way, through the rotation of the turntable, the plurality of carrier assemblies are driven to pass through the feeder position, the pressurizing position, and the unloading position in turn, so that cell feeding, cell pressurizing and grouping, and cell group unloading can be supported in parallel, thereby reducing production time and improving production efficiency.

In some embodiments, the turntable is controlled to rotate to drive the first carrier assembly to move from the pressurizing position to the unloading position; and under the condition that the first carrier assembly moves to the unloading position, the unloading and grabbing device is controlled to grab the cell group in the first carrier assembly to a cell group storage position.

In this way, the unloading operation of the cell groups can be accurately and efficiently completed by the unloading and grabbing device.

In some embodiments, the unloading position includes a first unloading position and a second unloading position, and the unloading and grabbing device includes a first unloading and grabbing mechanism and a second unloading and grabbing mechanism. The controlling the turntable to rotate to drive the first carrier assembly to move from the pressurizing position to the unloading position includes: controlling the turntable to rotate to drive the first carrier assembly to move from the pressurizing position to the first unloading position and the second unloading position in turn; and the controlling, under the condition that the first carrier assembly moves to the unloading position, the unloading and grabbing device to grab the cell groups in the first carrier assembly to a cell group storage position includes: under the condition that the first carrier assembly moves to the first unloading position, controlling the first unloading and grabbing mechanism to grab cell groups in a first carrier position of the first carrier assembly to the cell group storage position; and under the condition that the first carrier assembly moves to the second unloading position, controlling the second unloading and grabbing mechanism to grab cell groups located in a second carrier position of the first carrier assembly to the cell group storage position, where the first carrier position and the second carrier position in the first carrier assembly are alternately distributed along an arrangement direction of the cell groups.

In this way, the cell groups in the first carrier assembly can be quickly unloaded to the cell storage position by disposing the first unloading position and the second unloading position and using the first unloading and grabbing mechanism and the second unloading and grabbing mechanism to grab the grouped cell groups from the first unloading position and the second unloading position respectively, thereby improving the production efficiency of module assembly. In addition, the first carrier position and the second carrier position in the first carrier assembly are alternately distributed, so a larger operation space can be provided for the first unloading and grabbing mechanism and the second unloading and grabbing mechanism, thereby reducing the space limitations and lowering the control difficulty.

It should be understood that both the foregoing general description and the following detailed description are merely exemplary and illustrative, and are not intended to limit the technical solutions of this disclosure.

BRIEF DESCRIPTION OF DRAWINGS

The drawings, which are incorporated in and constitute a part of this specification, illustrate some embodiments of this disclosure and are used together with the specification to interpret the technical solutions of this disclosure.

DETAILED DESCRIPTION OF EMBODIMENTS

Figure 1:
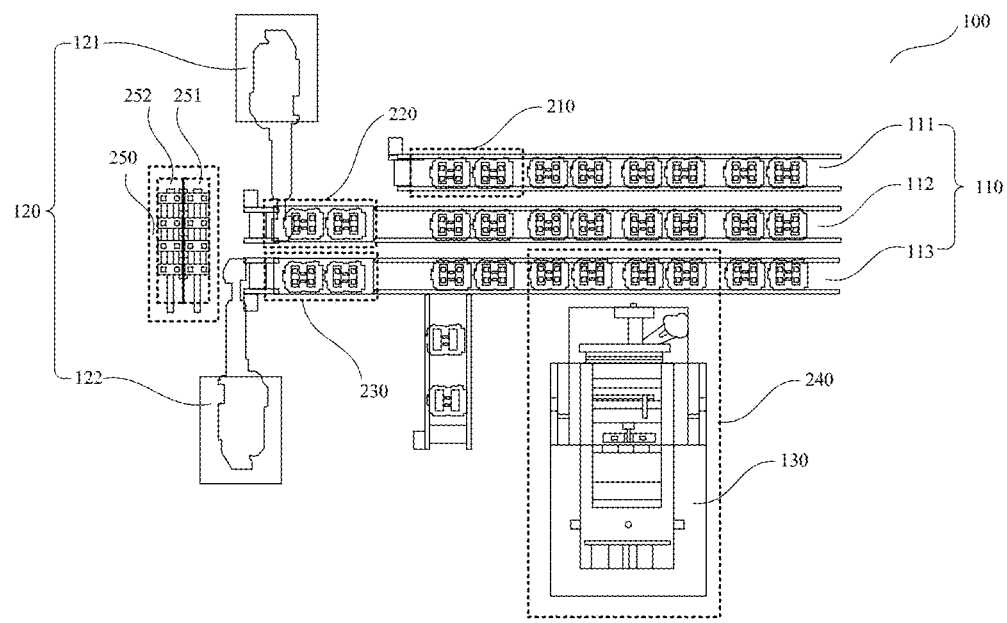
FIG. 1 is a first schematic structural diagram of a cell feeding system according to an embodiment of this disclosure.

To make objectives, technical solutions and advantages of this disclosure clearer, the following gives a clear description of the technical solutions of this disclosure with reference to the drawings and the embodiments. The described embodiments should not be regarded as the limitations of this disclosure. All other embodiments derived by a person of ordinary skill in the art based on the embodiments of this invention without making any creative effort fall within the protection scope of this disclosure.

In the following description, reference is made to "some embodiments", which describe a subset of all possible embodiments, but it can be understood that "some embodiments" may be the same subset or different subsets of all possible embodiments, and may be combined with each other, to the extent that no conflict occurs.

The involved terms "first/second/third" merely intended to distinguish between similar objects, and do not represent a specific ordering of the objects. It can be understood that "first/second/third" can be interchanged in a specific order or sequence if permitted, such that the embodiments this disclosure described herein can be implemented in other orders than those illustrated or described herein.

Unless otherwise defined, all technical and scientific terms used herein bear the same meanings as what is normally understood by a person skilled in the technical field of this disclosure. The terms used herein are merely intended to describe this disclosure but not to limit this disclosure.

The following makes a detailed description of embodiments of this disclosure.

Battery products are more and more widely used in life and industry. Battery products are not only used in energy storage power systems such as hydro, thermal, wind, and solar power stations, but also widely used in electric transports such as electric bicycles, electric motorcycles, and electric vehicles, and used in many other fields such as aerospace.

In some embodiments of this disclosure, the cell may be an individual battery. Individual battery refers to the basic unit that can realize the mutual conversion between chemical energy and electric energy, and can be used to make battery modules or battery packs, so as to supply power to electrical apparatus. The individual battery may be a secondary battery, and the secondary battery is an individual battery that is reusable through activation of an active material in the individual battery by charging the individual battery that is discharged. The individual battery may be a lithium-ion battery, a sodium-ion battery, a sodium-lithium-ion battery, a lithium metal battery, a sodium metal battery, a lithium-sulfur battery, a magnesium-ion battery, a nickel-hydrogen battery, a nickel-cadmium battery, and a lead storage battery. The specific type of the individual battery is not limited herein.

In the process of producing battery products, a plurality of cells can be assembled into a battery module, and a plurality of battery modules can be assembled into a battery pack, the battery module may include a single-row module and a double-row module. Some models of battery pack may include a mixture of single-row modules and double-row modules. However, in the related art, the process of assembling battery modules can not realize the collinear production of single-/double-row modules, and in the case that the produced battery pack includes a mixture of single-row modules and double-row modules, these two types of the module can only be produced separately. Because the process of switching between two types of module production is time-consuming, it is usually difficult to match the assembly efficiency of the battery packs, which leads to low production efficiency of the battery packs. In addition, one type of module produced first cannot form a battery pack alone, so it needs to occupy a large storage space, thus affecting the space utilization in the shop floor.

An embodiment of this disclosure provides a cell feeding system. As shown in FIG. 1, the cell feeding system 100 includes a conveyance device 110 and a feeding and grabbing device 120. The conveyance device 110 includes a first conveyor line 111, a second conveyor line 112, and a third conveyor line 113, and the feeding and grabbing device 120 includes a first feeding and grabbing mechanism 121 and a second feeding and grabbing mechanism 122, where the first conveyor line 111 is configured to convey inflowing cells to a first material fetching position 210;
the second conveyor line 112 is configured to convey inflowing cells to a second material fetching position 220;
the third conveyor line 113 is configured to convey inflowing cells to a side taping station 240 for side taping treatment, and convey the cells subjected to the side taping treatment to a third material fetching position 230;
the first feeding and grabbing mechanism 121 is configured to grab a first number of cells from the first material fetching position 210 to a first feeding area 251 in a feeder position 250; and
the second feeding and grabbing mechanism 122 is configured to grab the first number of cells from a target material fetching position to a second feeding area 252 in the feeder position 250; where
the target material fetching position is selected from the second material fetching position 220 and the third material fetching position 230 based on a type of a current module to be assembled, and the cells in the first feeding area 251 and the cells in the second feeding area 252 are configured to be grouped in one-to-one correspondence to obtain a first number of cell groups, the cell group including two cells with side surfaces opposite each other.

The first number can be manually set by the operator according to the actual production demand, or determined according to the production formula of the currently produced battery pack, which is not limited herein. For example, the first number can be 3, 4, 8, or the like.

It can be understood that the first feeding and grabbing mechanism 121 can grab the first number of cells from the first material fetching position 210 to the first feeding area 251 at one time, or grab one or more cells from the first material fetching position 210 to the first feeding area 251 in batches until the first number of cells are grabbed to the first feeding area 251. The second feeding and grabbing mechanism 122 can grab the first number of cells from the target material fetching position to the second feeding area 252 at one time, or grab one or more cells from the target material fetching position to the second feeding area 252 in batches until the first number of cells are grabbed to the second feeding area 252.

In some embodiments, both the first feeding and grabbing mechanism 121 and the second feeding and grabbing mechanism 122 can be robots, such as at least one of a six-axis robot or a three-axis robot.

Figure 2:
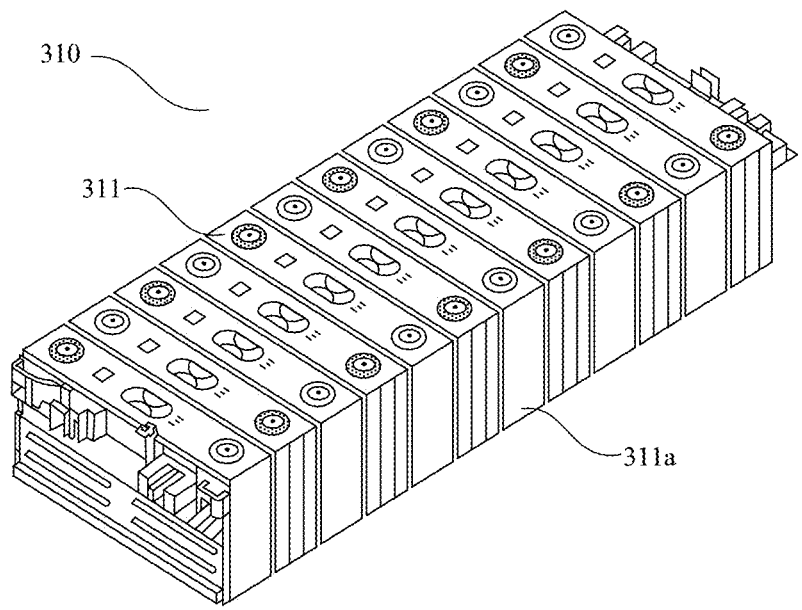
FIG. 2 is a schematic structural diagram of a single-row module according to an embodiment of this disclosure.
Figure 3:
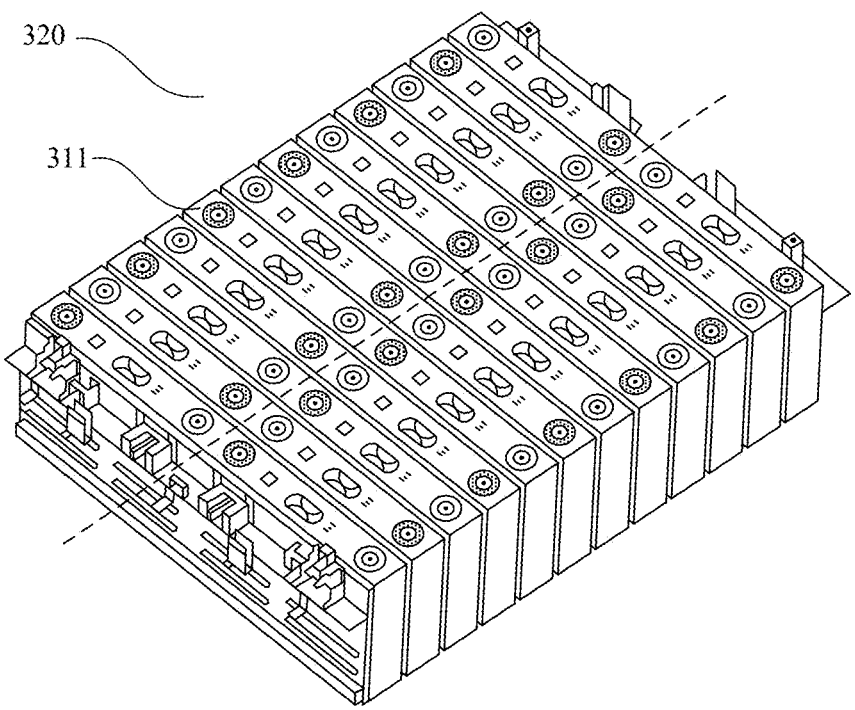
FIG. 3 is a schematic structural diagram of a double-row module according to an embodiment of this disclosure.

In some embodiments, the type of current module to be assembled may include single-row module or double-row module. As shown in FIG. 2, the single-row module 310 includes a plurality of cells 311 with major faces (not shown in the drawing) arranged oppositely, and a side surface 311*a* of each cell 311 is exposed. As shown in FIG. 3, the double-row module 320 includes two rows of cells 311 in parallel, and each row of cells 311 includes a plurality of cells 311 with major faces (not shown in the drawing) arranged oppositely, and the two rows of cells 311 are aligned in one-to-one correspondence with the side surfaces arranged oppositely, and every two aligned cells 311 are attached by an adhesive tape attached to the side surfaces.

In some embodiments, the first feeding area 251 may include a first cell sequence, and the second feeding area 252 may include a second cell sequence. Each cell in the first cell sequence and each cell in the second cell sequence are aligned in one-to-one correspondence with the side surfaces arranged oppositely, and a first number of cell groups can be obtained by bringing every two aligned cells closer and grouping.

Figure 4:
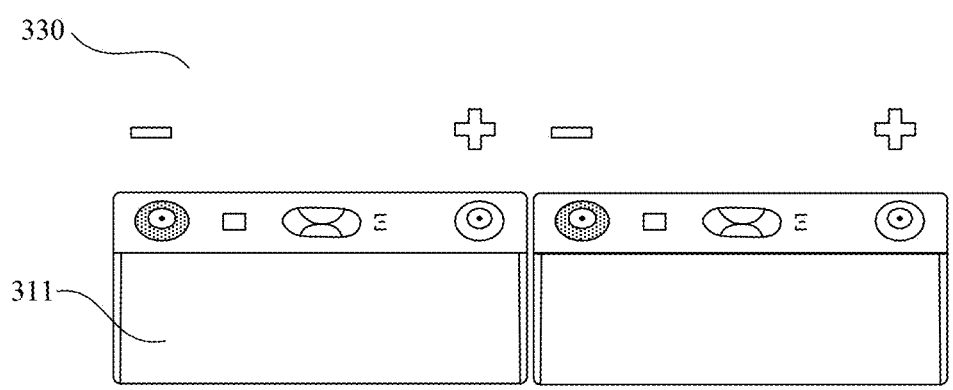
FIG. 4 is a schematic structural diagram of a cell group according to an embodiment of this disclosure.

As shown in FIG. 4, one cell group 330 includes two cells 311 with side surfaces opposite each other.

Figure 5:
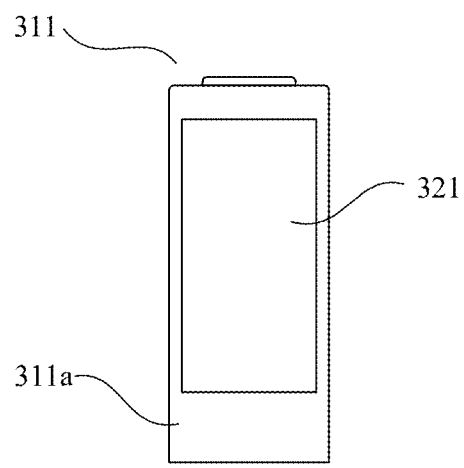
FIG. 5 is a schematic side view of a cell with side taping applied according to an embodiment of this disclosure.

As shown in FIG. 5, after the cell 311 for grabbing in the third material fetching position 230 is subjected to side taping treatment, an adhesive tape 321 is taped to one side surface 311*a* of the cell 311.

In the cell feeding system in this embodiment of this disclosure, the first feeding and grabbing mechanism grabs the first number of cells from the first material fetching position to the first feeding area in the feeder position, and the second feeding and grabbing mechanism grabs the first number of cells from the target material fetching position to the second feeding area in the feeder position, where the target material fetching position is selected from the second material fetching position and the third material fetching position based on the type of the current module to be assembled. The cells to be grabbed from the first material fetching position and the second material fetching position are not subjected to side taping treatment, and the cells to be grabbed from the third material fetching position are subjected to side taping treatment. Therefore, in a case that the cells are grabbed from the first material fetching position and the second material fetching position, the cells on the first feeding area and the cells on the second feeding area can be grouped in one-to-one correspondence to obtain the cell groups with cells not affixed, so as to assemble the single-row module. In a case that the cells are grabbed from the first material fetching position and the third material fetching position, the cells on the first feeding area and the cells on the second feeding area can be grouped in one-to-one correspondence to form the cell groups with cells affixed, so as to assemble the double-row module. In this way, based on the type of the current module to be assembled, the cells can be grabbed from the corresponding material fetching position to the second feeding area in the feeder position, so as to compatibly provide the suitable cells as assembly materials for different types of modules, and further provide support for assembly automatically compatible with single-/double-row modules, thereby improving the production efficiency and simplifying the control logic of the system. In addition, in a scenario of assembling a battery pack including a mixture of the single-row modules and the double-row modules, the assembly automatically compatible with single-/double-row modules can be supported, so there is no need to switch module types for production in the process of producing the battery pack. In this way, compared with the solution of first assembling a required number of battery modules of one type and then assembling battery modules of another type, this embodiment of this disclosure can save module storage space and improve space utilization.

In some embodiments, under the condition that the type of current module to be assembled is single-row module, the second material fetching position is the target material fetching position; and under the condition that the type of the current module to be assembled is double-row module, the third material fetching position is the target material fetching position.

In this way, under the condition of assembling a single-row module, the first number of cells are grabbed from the second material fetching position to the second feeding area in the feeder position to obtain the cell groups with cells not affixed; and under the condition of assembling a double-row module, the first number of cells are grabbed from the third material fetching position to the second feeding area in the feeder position to obtain the cell groups with cells affixed together. In this way, the suitable cells can be compatibly provided as assembly materials for single-row modules or double-row modules, thus facilitating the simple and efficient collinear production of single-/double-row modules.

Figure 6:
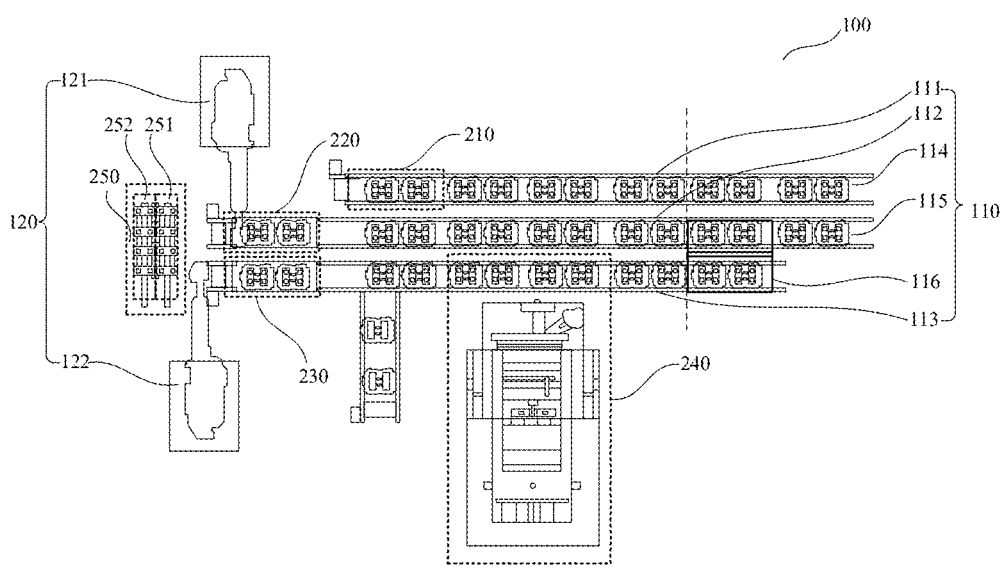
FIG. 6 is a second schematic structural diagram of a cell feeding system according to an embodiment of this disclosure.

In some embodiments, as shown in FIG. 6, the conveyance device 110 further includes a fourth conveyor line 114, a fifth conveyor line 115 and a shunt mechanism 116.

An output end of the fourth conveyor line 114 is connected to an input end of the first conveyor line 111.

An output end of the fifth conveyor line 115 is connected to the shunt mechanism 116.

The shunt mechanism 116 is configured to shunt the cells on the fifth conveyor line 115 to the second conveyor line 112 and/or the third conveyor line 113 based on the ratio of a quantity of the single-row modules to a quantity of the double-row modules in at least one module to be assembled.

Herein, the fourth conveyor line 114 is the upstream conveyor line of the first conveyor line 111, and the fifth conveyor line 115 is the upstream conveyor line of the second conveyor line 112 and the third conveyor line 113. The cells processed in the previous process can flow to the fourth conveyor lines 114 and the fifth conveyor lines 115.

The output end of the fourth conveyor line 114 is connected to the input end of the first conveyor line 111, so that the cells on the fourth conveyor line 114 can be directly conveyed to the first conveyor line 111 in turn.

The output end of the fifth conveyor line 115 is connected to the shunt mechanism 116, so that the cells on the fifth conveyor line 115 can flow to the shunt mechanism 116.

At least one module to be assembled may include modules required for producing one or more battery packs. For example, in the case that the battery pack currently produced includes two single-row modules and four double-row modules, the at least one module to be assembled may include modules required for assembling one battery pack, namely, two single-row modules and four double-row modules, or the at least one module to be assembled may include modules required for assembling two battery packs, namely, four single-row modules and eight double-row modules.

In some embodiments, the quantity ratio of single-row modules to double-row modules in at least one module to be assembled can be determined according to the production formula of the battery pack currently produced. For example, according to the production formula of the currently produced battery pack, it is determined that the currently produced battery pack includes two single-row modules and four double-row modules, and the modules required for producing a battery pack are determined to be assembled at one time, then the quantity ratio of single-row modules to double-row modules in at least one module to be assembled currently is 2:4, that is, the at least one module to be assembled currently includes two single-row modules and four double-row modules. For another example, according to the production formula of the currently produced battery pack, it is determined that the currently produced battery pack includes three single-row modules and four double-row modules, and the modules required for producing two battery packs are determined to be assembled at one time, then the quantity ratio of single-row modules to double-row modules in at least one module to be assembled currently is 6:8, that is, the at least one module to be assembled currently includes six single-row modules and eight double-row modules.

Based on the quantity ratio of single-row modules to double-row modules in at least one module to be assembled, the number of cells to be respectively diverted to the second conveyor line 112 and the third conveyor line 113 can be determined, so that the shunt mechanism 116 can shunt the cells on the fifth conveyor line 115 to the second conveyor line 112 and/or the third conveyor line 113 according to the quantity ratio.

During implementation, a person skilled in the art can use any suitable shunt mechanism 116 to shunt the cells on the fifth conveyor line 115 to the second conveyor line 112 and/or the third conveyor line 113 according to the actual situation, without being limited herein.

In some embodiments, the shunt mechanism 116 may be a lifting and traversing mechanism.

In the above embodiment, the shunt mechanism may be configured to shunt the cells flowing from the upstream to the second conveyor line and/or the third conveyor line according to the quantity ratio of single-row modules to double-row modules in at least one module to be assembled currently, so as to provide corresponding cells as assembly materials for assembling the single-row module and the double-row module according to the quantity ratio.

In some embodiments, still referring to FIG. 1, the cell feeding system 100 further includes:
  a taping mechanism 130, configured to conduct the side taping treatment at the side taping station 240 for the cells which are on the third conveyor line 113.

Herein, the taping mechanism 130 can be arranged at the side taping station 240, and when the cell flows into the side taping station 240 from the third conveyor line 113, the taping mechanism 130 can conduct the side taping treatment for the cell, so as to tape the adhesive tape to one side surface of the cell.

In this way, the cells on the third conveyor line are subjected to side taping treatment conducted by the taping mechanism, so that the cells for grabbing in the third material fetching position are all subjected to side taping treatment, and can be grouped with the cells for grabbing in the first material fetching position to obtain the cell groups with cells affixed.

Figure 7:
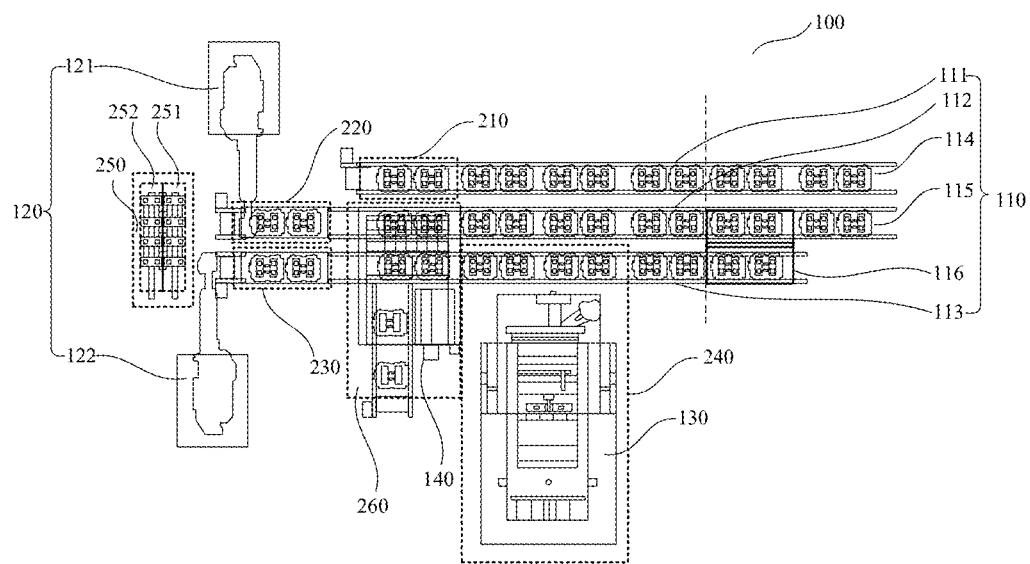
FIG. 7 is a third schematic structural diagram of a cell feeding system according to an embodiment of this disclosure.

In some embodiments, as shown in FIG. 7, the cell feeding system 100 further includes:
  a detection mechanism 140, configured to detect the taping of the cell on the third conveyor line 113 at the detection station 260 to obtain a detection result of the cell; and
  the third conveyor line 113 is further configured to convey the detected cell to the third material fetching position 230 under the condition that the detection result indicates that the cell is normally taped.

Herein, the detection mechanism 140 can be arranged at the detection station 260, and when the cells on the third conveyor line 113 flow into the detection station 260, the detection mechanism 140 can detect the side taping of the cells to obtain the detection results of the cells. The detection results of cells can render whether the cells are taped normally or abnormally.

The detection mechanism 140 can detect the side taping of the cell, including but not limited to at least one of detecting whether an adhesive tape is taped to the side surface of the cell on the third conveyor line 113, whether the position of the adhesive tape taped to the side surface of the cell is accurate, and whether the release paper on the adhesive tape surface is torn off.

For example, if it is detected at least one of the situations that the side surface of the cell on the third conveyor line 113 is not taped to adhesive tape, the position of the adhesive tape taped to the side surface of the cell is inaccurate, or the release paper on the surface of the adhesive tape is not torn off, it can be determined that the detection result of the cell renders that the cell is taped abnormally. If it is detected that the side surface of the cell on the third conveyor line 113 has been taped to adhesive tape, the position of the adhesive tape taped to the side surface of the cell is accurate, and the release paper on the adhesive tape surface has been torn off, it can be determined that the detection result of the cell renders that the cell is taped normally.

In this way, the third conveyor line also conveys the cell to flow through the detection station before conveying the cell to the third material fetching position, so as to conduct side taping detection on the cell, thereby improving the accuracy of cell taping in the third material fetching position, and further improving the yield of battery products.

Figure 8:
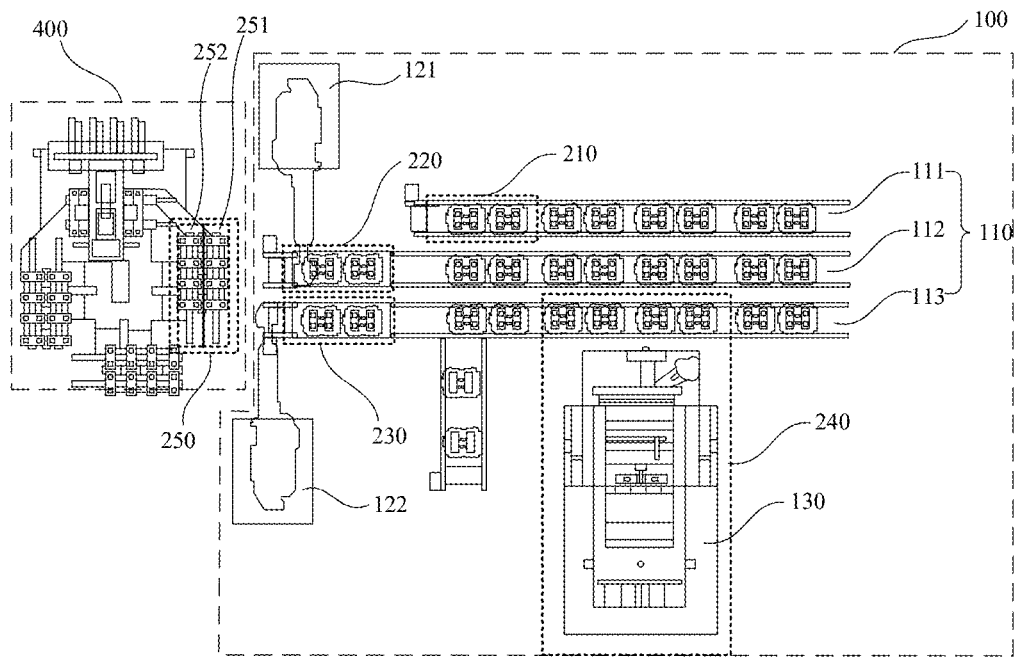
FIG. 8 is a first schematic structural diagram of a cell grouping system according to an embodiment of this disclosure.

An embodiment of this disclosure provides a cell grouping system. As shown in FIG. 8, the cell grouping system includes:

the cell feeding system 100 disclosed in the foregoing embodiments, configured to separately feed the first number of cells to the first feeding area 251 and the second feeding area 252 of the feeder position 250; and a cell grouping device 400, configured to group the cells in the first feeding area 251 and the cells in the second feeding area 252 in one-to-one correspondence to obtain a first number of cell groups, where the cell group includes two cells with side surfaces opposite each other.

The cell grouping system in this embodiment of this disclosure, based on the cell feeding system, can compatibly provide cells adapted to different types of the module as assembly materials, and form corresponding cell groups, thus providing support for assembly automatically compatible with compatible single-/double-row modules, improving production efficiency, simplifying control logic of the system, saving module storage space, and improving space utilization.

Figure 9:
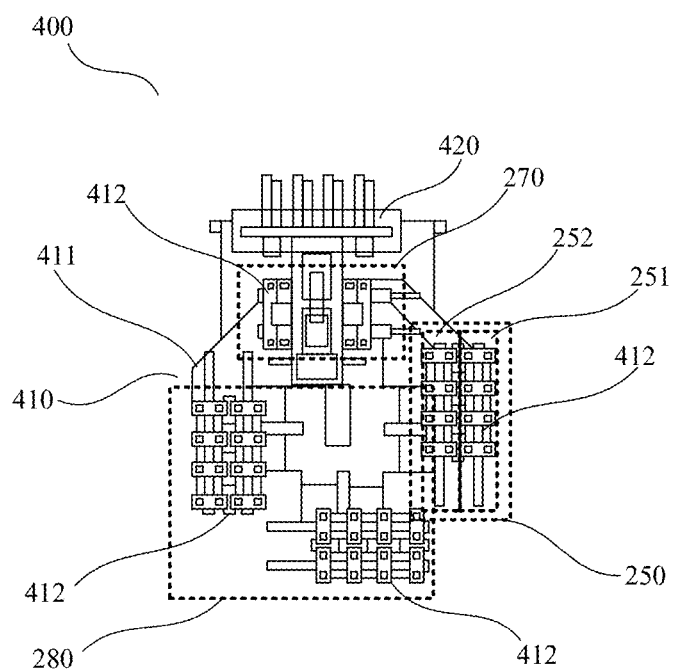
FIG. 9 is a schematic structural diagram of a cell grouping device according to an embodiment of this disclosure.
Figure 10:
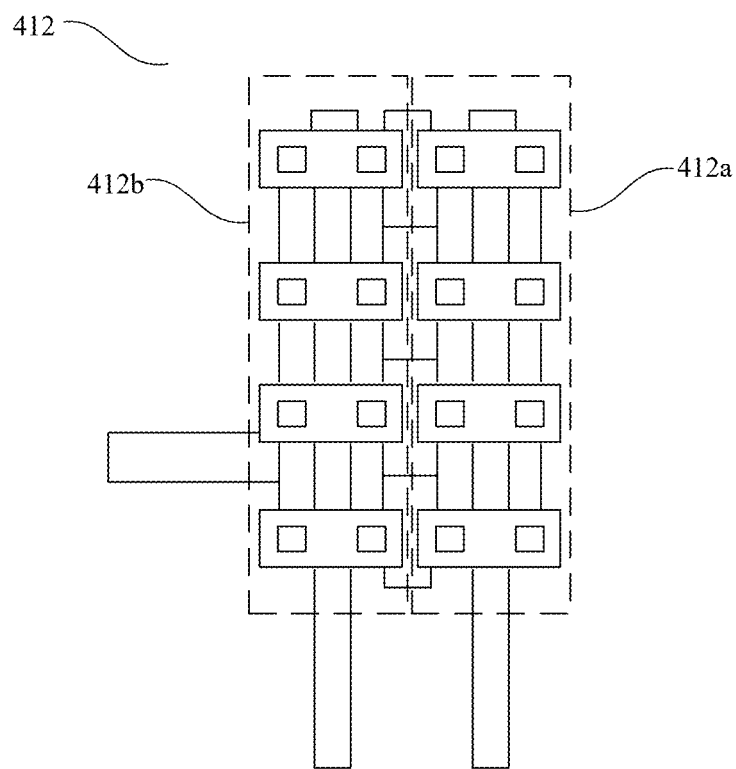
FIG. 10 is a first schematic structural diagram of a carrier assembly according to an embodiment of this disclosure.

In some embodiments, as shown in FIGS. 9 and 10, the cell grouping device 400 includes a cell grouping mechanism 410 and a pressurizing mechanism 420, and the cell grouping mechanism 410 includes a turntable 411 and a plurality of carrier assemblies 412 distributed on the turntable 411.

The turntable 411 is configured to drive, through rotation, each carrier assembly 412 to pass through the feeder position 250, a pressurizing position 270, and an unloading position 280 in turn. Under the condition that the carrier assembly 412 moves to the feeder position 250, a first carrier area 412a of the carrier assembly 412 serves as the first feeding area 251, and a second carrier area 412b of the carrier assembly 412 serves as the second feeding area 252.

The pressurizing mechanism 420 is located at the pressurizing position 270, and is configured to, under the condition that the carrier assembly 412 moves to the pressurizing position 270, laterally pressurize the cells in the first carrier area 412a of the carrier assembly 412 and the cells in the second carrier area 412b of the carrier assembly 412, so as to bring the cells in the first carrier area 412a of the carrier assembly 412 and the cells in the second carrier area 412b of the carrier assembly 412 closer to each other in one-to-one correspondence, thereby forming the first number of cell groups.

It can be understood that a plurality of carrier assemblies 412 distributed on the turntable 411 can be located at the feeder position 250, the pressurizing position 270 and the unloading position 280, respectively, and each carrier assembly 412 can be driven to pass through the feeder position 250, the pressurizing position 270 and the unloading position 280 in turn by the rotation of the turntable. For example, the turntable 411 is provided with a first carrier assembly, a second carrier assembly and a third carrier assembly, the first carrier assembly, the second carrier assembly and the third carrier assembly are located at the feeder position 250, the pressurizing position 270 and the unloading position 280, respectively. The turntable can rotate to drive the first carrier assembly to move from the feeder position 250 to the pressurizing position 270, the second carrier assembly to move from the pressurizing position 270 to the unloading position 280, and the third carrier assembly to move from the unloading position 280 to the feeder position 250, so that the turntable can rotate to drive the first carrier assembly, the second carrier assembly, and the third carrier assembly to pass through the feeder position 250, the pressurizing position 270 and the unloading position 280 in turn, respectively.

Each carrier assembly 412 may have a first carrier area 412a and a second carrier area 412b. It can be understood that during implementation, the positions of the first carrier area 412a and the second carrier area 412b can be interchanged, without being limited herein.

When the carrier assembly 412 moves to the feeder position 250, the first carrier area 412a of the carrier assembly 412 serves as the first feeding area 251 and the second carrier area 412b of the carrier assembly 412 serves as the second feeding area 252. When the carrier assembly 412 is moved from the feeder position 250 to the pressurizing position 270, the first carrier area 412a and the second carrier area 412b of the next carrier assembly 412 moved to the feeder position 250 can serve as the first feeding area 251 and the second feeding area 252, respectively.

For example, the first feeding area 251 may include a first cell sequence arranged in a row, and the second feeding area 252 may include a second cell sequence arranged in a row. Each cell in the first cell sequence is aligned with each cell in the second cell sequence with the side surfaces disposed opposite each other, and the pressurizing mechanism 420 may be used to pressurize each cell in the first cell sequence in a direction close to the second cell sequence and each cell in the second cell sequence in a direction close to the first cell sequence, so that each two aligned cell are close to each other and grouped, thereby forming a plurality of cell groups.

In some embodiments, the first carrier area 412a and the second carrier area 412b may be respectively provided with a cell clamping for carrying the cells. The pressurizing mechanism can drive the first cell sequence in the first carrier area 412*a* and the second cell sequence in the second carrier area 412*b* to be close to each other and grouped by controlling the cell clamping in the first carrier area 412*a* and the cell clamping in the second carrier area 412*b* to move towards each other.

In this way, through the rotation of the turntable, the plurality of carrier assemblies are driven to pass through the feeder position, the pressurizing position, and the unloading position in turn, so that cell feeding, cell pressurizing and grouping, and cell group unloading can be supported in parallel, thereby reducing production time and improving production efficiency.

Figure 11:
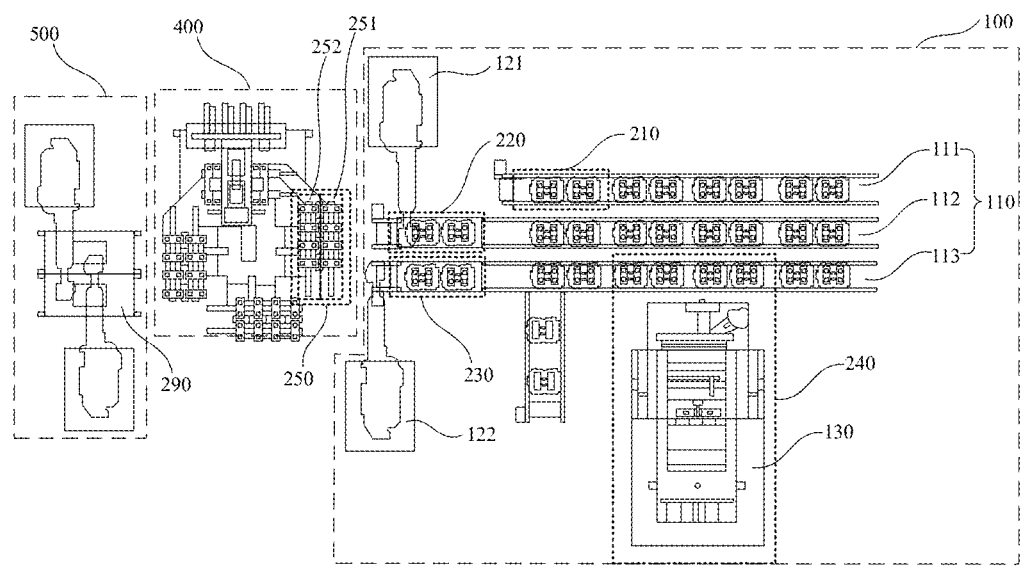
FIG. 11 is a second schematic structural diagram of the cell grouping system according to an embodiment of this disclosure.

In some embodiments, as shown in FIG. 11, the cell grouping system further includes:

an unloading and grabbing device 500, configured to grab the cell groups from the carrier assembly 412 to a cell group storage position 290 under the condition that the carrier assembly 412 moves to the unloading position 280.

In some embodiments, the unloading and grabbing device 500 may be a robot, such as at least one of a six-axis robot or a three-axis robot.

In some embodiments, the cell group storage position 290 may be a cache table for temporary storing the cell groups.

In some embodiments, the cell group storage position 290 may include a tray for carrying the cell groups.

In the foregoing embodiments, the unloading operation of the cell groups can be accurately and efficiently completed by the unloading and grabbing device.

Figure 12:
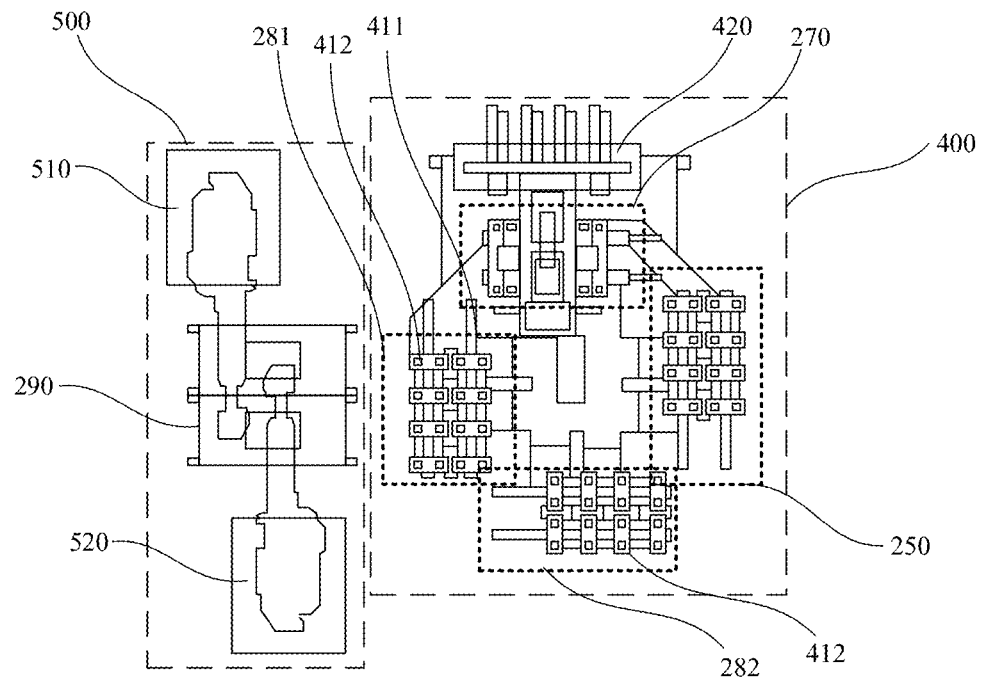
FIG. 12 is a schematic structural diagram of the cell grouping device and an unloading and grabbing device in the cell grouping system according to an embodiment of this disclosure.
Figure 13:
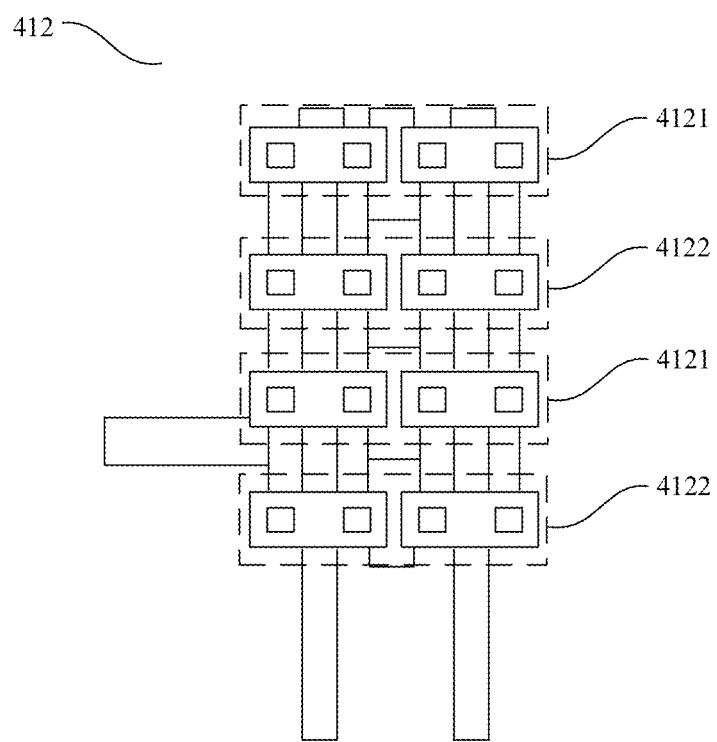
FIG. 13 is a second schematic structural diagram of a carrier assembly according to an embodiment of this disclosure.

In some embodiments, as shown in FIGS. 12 and 13, the unloading position 280 includes a first unloading position 281 and a second unloading position 282, and the turntable 411 is used to drive, through rotation, each carrier assembly 412 to pass through the feeder position 250, the pressurizing position 270, the first unloading position 281, and the second unloading position 282 in turn.

The unloading and grabbing device 500 includes:

a first unloading and grabbing mechanism 510, configured to grab the cell groups located in a first carrier position 4121 of the carrier assembly 412 to the cell group storage position 290 under the condition that the carrier assembly 412 moves to the first unloading position 281; and a second unloading and grabbing mechanism 520, configured to grab the cell groups located in a second carrier position 4122 of the carrier assembly 412 to the cell group storage position 290 under the condition that the carrier assembly 412 moves to the second unloading position 282, where the first carrier positions 4121 and the second carrier positions 4122 in the carrier assembly 412 are alternately distributed along an arrangement direction of the cell groups.

In practical implementations, each cell group can be located in one carrier position of the carrier assembly 412. The carrier positions in the carrier assembly 412 may include first carrier positions 4121 and second carrier positions 4122 alternately distributed along the arrangement direction of the cell groups. It can be understood that the positions of the first carrier position 4121 and the second carrier position 4122 can be interchanged with each other, without being limited herein.

In this way, the cell groups in the carrier assembly can be quickly unloaded to the cell storage position by disposing the first unloading position and the second unloading position, and using the first unloading and grabbing mechanism and the second unloading and grabbing mechanism to grab the grouped cell groups from the first unloading position and the second unloading position respectively, thereby accelerating the production progress, and improving the production efficiency of module assembly. In addition, the first carrier position and the second carrier position in the carrier assembly are alternately distributed, so a larger operation space can be provided for the first unloading and grabbing mechanism and the second unloading and grabbing mechanism, thereby reducing the space limitations and lowering the control difficulty.

An embodiment of this disclosure provides an operation system for module assembly. The operation system for module assembly includes one of the following: the cell feeding system disclosed above; or the cell grouping system disclosed above.

The operation system for assembly module in this embodiment of this disclosure can compatibly provide suitable cells as assembly materials for different types of modules, thus providing support for assembly automatically compatible with single-/double-row modules, improving production efficiency, simplifying control logic of the system, saving module storage space, and improving space utilization.

Figure 14:
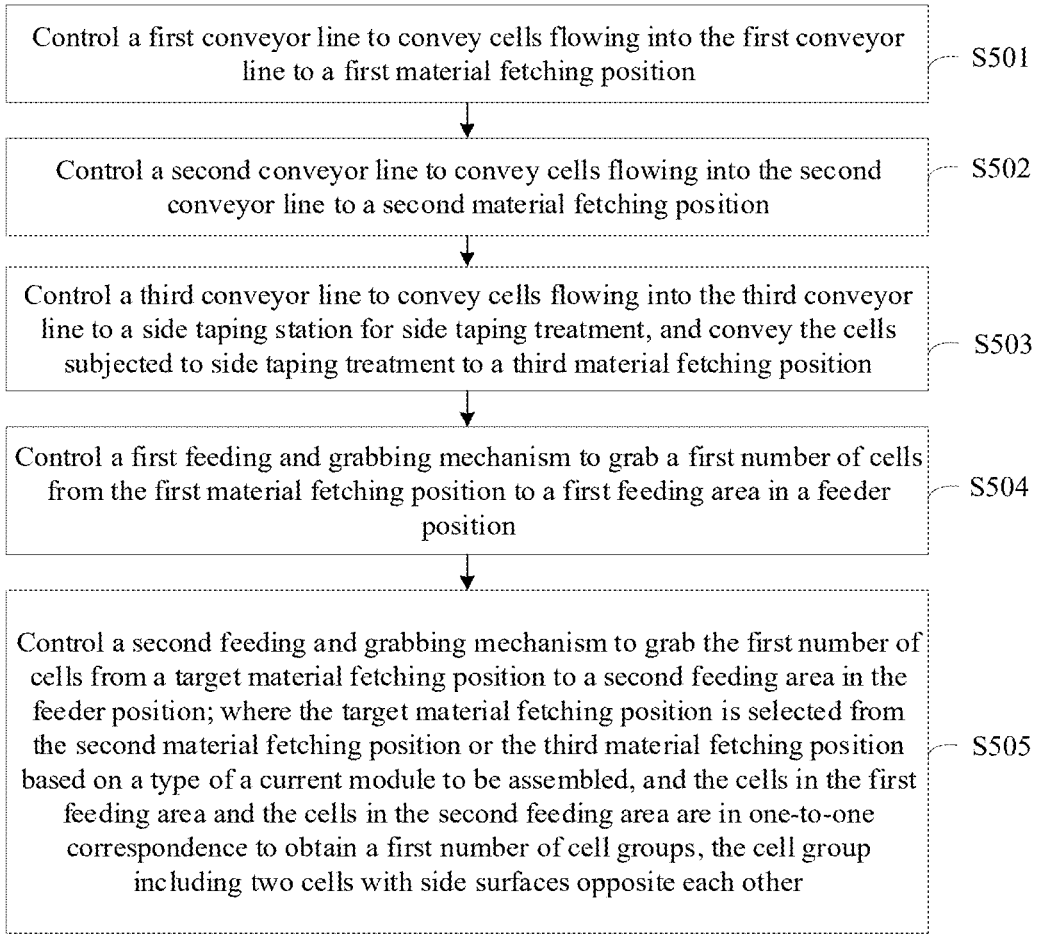
FIG. 14 is a schematic implementation flowchart of a cell feeding method according to the embodiment of this disclosure.

An embodiment of this disclosure provides a cell feeding method. The cell feeding method can be executed by a controller. It can be understood that in industrial production, the controller can refer to an upper-level computer, such as a server, a notebook computer, a tablet computer, a desktop computer, or a smartphone. The controller can also refer to a lower-level computer, such as an industrial computer or a programmable logic controller (Programmable Logic Controller, PLC). FIG. 14 is a schematic implementation flowchart of a cell feeding method provided in an embodiment of this disclosure. As shown in FIG. 14, the method may include the following steps S501 to S505:

Step S501: Control a first conveyor line to convey cells flowing into the first conveyor line to a first material fetching position.

Step S502: Control a second conveyor line to convey cells flowing into the second conveyor line to a second material fetching position.

Step S503: Control a third conveyor line to convey cells flowing into the third conveyor line to a side taping station for side taping treatment, and convey the cells subjected to side taping treatment to a third material fetching position.

Step S504: Control a first feeding and grabbing mechanism to grab a first number of cells from the first material fetching position to a first feeding area in a feeder position.

Step S505: Control a second feeding and grabbing mechanism to grab the first number of cells from a target material fetching position to a second feeding area in the feeder position; where the target material fetching position is selected from the second material fetching position and the third material fetching position based on a type of a current module to be assembled, and the cells in the first feeding area and the cells in the second feeding area are configured to be grouped in one-to-one correspondence to obtain a first number of cell groups, the cell group including two cells with side surfaces opposite each other.

In some embodiments, a single controller may be provided, and the first conveyor line, the second conveyor line, the third conveyor line, the first feeding and grabbing mechanism and the second feeding and grabbing mechanism can be centrally controlled by the single controller.

In some embodiments, a plurality of controllers may be provided, and the plurality of controllers are used to control the first conveyor line, the second conveyor line, the third conveyor line, the first feeding and grabbing mechanism, and the second feeding and grabbing mechanism, respectively.

The cell feeding method in this embodiment of this disclosure can compatibly provide suitable cells as assembly materials for different types of modules, thus providing support for assembly automatically compatible with single-/double-row modules, improving production efficiency, simplifying control logic of the system, saving module storage space, and improving space utilization.

In some embodiments, before the step S505, the cell feeding method further includes the following step S511:

Step S511: Select, based on the type of the current module to be assembled, the target material fetching position from the second material fetching position and the third material fetching position.

In this way, the target material fetching position corresponding to the type of the current module to be assembled can be automatically and quickly determined.

In some embodiments, the foregoing step S511 may include the following step S521 or S522:

Step S521: Select the second material fetching position as the target material fetching position under the condition that the type of the current module to be assembled is single-row module.

Step S522: Select the third material fetching position as the target material fetching position under the condition that the type of the current module to be assembled is double-row module.

In this way, under the condition of assembling a single-row module, the first number of cells are grabbed from the second material fetching position to the second feeding area in the feeder position to obtain the cell groups with cells not affixed; and under the condition of assembling a double-row module, the first number of cells are grabbed from the third material fetching position to the second feeding area in the feeder position to obtain the cell groups with cells affixed together. In this way, the suitable cells can be compatibly provided for single-row modules or double-row modules as assembly materials, thus facilitating the simple and efficient collinear production of single-/double-row modules.

In some embodiments, the cell feeding method further includes the following steps S531 to S533.

Step S531: Control the fourth conveyor line to sequentially convey cells on the fourth conveyor line to the first conveyor line.

Step S532: Determine a quantity ratio of single-row modules to double-row modules in at least one module to be assembled.

Step S533: Based on the quantity ratio, control a shunt mechanism to shunt cells on the fifth conveyor line to the second conveyor line and/or the third conveyor line.

In this way, based on the quantity ratio of single-row modules to double-row modules in the at least one module to be assembled, the shunt mechanism can be controlled to shunt the cells flowing from the upstream to the second conveyor line and/or the third conveyor line, so as to provide corresponding cells as assembly materials for assembling the single-row module and the double-row module corresponding to the quantity ratio.

In some embodiments, the foregoing step S533 may include the following steps S541 and S542:

Step S541: Determine an assembly sequence of the at least one module based on the quantity ratio.

Step S542: Traverse the at least one module according to the assembly sequence, and perform the following operations on each module in the traversal process:

selecting a second target conveyor line from the second conveyor line or the third conveyor line based on a type of the module; and controlling the shunt mechanism to flow a second number of cells on the fifth conveyor line into the second target conveyor line, where the second number is the number of cell groups to be grouped corresponding to the module.

During implementation, a person skilled in the art can determine the assembly sequence of the at least one module based on the quantity ratio of single-row modules to double-row modules in at least one module to be assembled in any suitable way according to the actual situation, without being limited herein.

For example, when the quantity ratio of single-row modules to double-row modules in at least one module to be assembled is 2:4, the assembly sequence between the at least one module can be determined as a single-row module, a single-row module, a double-row module, a double-row module, and a double-row module; or a double-row module, a double-row module, a double-row module, a double-row module, a single-row module, and a single-row module; or a double-row module, a double-row module, a single-row module, a single-row module, a double-row module, and a double-row module.

The type of the module may include single-row module and double-row module.

In this way, the cells on the fifth conveyor line can be quickly and accurately diverted to the second conveyor line and/or the third conveyor line according to the assembly sequence corresponding to the quantity ratio of single-row modules to double-row modules in at least one module to be assembled.

In some embodiments, the cell feeding method further includes the following step S551.

Step S551: Sequentially determine, according to the assembly sequence, the at least one module as the current module to be assembled.

In this way, according to a unified assembly sequence, the shunt mechanism can be controlled to shunt the cells and the second feeding and grabbing mechanism can grab the cells, thus improving the accuracy of module assembly.

In some embodiments, the cell feeding method further includes the following step S561.

Step S561: In a case of an abnormal module with abnormal assembly, insert a new module with the same model as the abnormal module into at least one module to be traversed in the traversal process.

The abnormal module can be a module with abnormal assembly during module assembly. During implementation, the assembled module and/or semi-finished module can be detected at any suitable stage in the module assembly process, and when the abnormality of the assembled module and/or semi-finished module is detected, a new module with the same model as the abnormal module can be inserted into at least one module to be traversed in the current traversal process.

In this way, in the case of abnormal module assembly, new cells can be replenished in time for assembling new modules, thereby improving the fault tolerance of module assembly and reducing the waiting time for replenishing materials. In addition, since materials can be replenished flexibly in time in the case of abnormal module assembly, in the process of producing battery packs by setting up a production line, the production can be carried out in strict accordance with the quantity ratio of single-row modules to double-row modules in battery packs, with no need to produce redundant modules for fault tolerance. This can improve the material utilization and reduce the production costs.

In some embodiments, the cell feeding method further includes the following steps S571 to S573.

Step S571: Control the third conveyor line to convey the cells flowing into the third conveyor line to the side taping station.

Step S572: Control a taping mechanism in the side taping station to conduct the side taping treatment for the cells on the third conveyor line.

Step S573: Control the third conveyor line to convey the cells subjected to side taping treatment to the third material fetching position.

In this way, the cells on the third conveyor line are subjected to side taping treatment, so that the cells for grabbing in the third material fetching position are all subjected to side taping treatment, and can be grouped with the cells for grabbing in the first material fetching position to obtain the cell groups with cells affixed.

In some embodiments, the foregoing step S573 may include the following steps S581 to S583.

Step S581: Control the third conveyor line to convey the cell subjected to side taping treatment to a detection station.

Step S582: Control a detection mechanism in the detection station to conduct side taping detection on the cell on the third conveyor line to obtain a detection result of the cell.

Step S583: Under the condition that the detection result indicates that the cell is taped normally, control the third conveyor line to convey the detected cell to the third material fetching position.

In this way, the third conveyor line also conveys the cell to flow through the detection station before conveying the cell to the third material fetching position, so as to conduct side taping detection on the cell, thereby improving the accuracy of cell taping in the third material fetching position, and further improving the yield of battery products.

In some embodiments, under the condition that the detection result indicates that the cell is taped abnormally, a discharging mechanism can be controlled to discharge the cell from the third conveyor line, and the shunt mechanism can be controlled to refill and input a cell to the third conveyor line.

Figure 15:
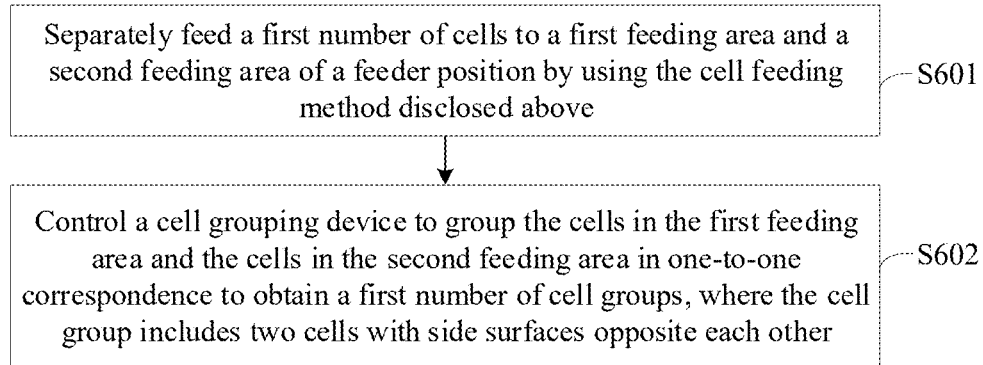
FIG. 15 is a schematic implementation flowchart of a cell grouping method according to an embodiment of this disclosure.

An embodiment of this disclosure provides a cell grouping method. The cell grouping method can be executed by a controller. It can be understood that in industrial production, the controller can refer to an upper-level computer, such as a server, a notebook computer, a tablet computer, a desktop computer, or a smartphone. The controller can also refer to a lower-level computer, such as an industrial computer or a PLC. FIG. 15 is a schematic implementation flowchart of a cell grouping method according to an embodiment of this disclosure. As shown in FIG. 15, the method may include the following S601 and S602.

S601: Separately feed a first number of cells to a first feeding area and a second feeding area of a feeder position by using the cell feeding method disclosed above.

S602: Control a cell grouping device to group the cells in the first feeding area and the cells in the second feeding area in one-to-one correspondence to obtain a first number of cell groups; where the cell group includes two cells with side surfaces opposite each other.

The cell grouping method in this embodiment of this disclosure can compatibly provide suitable cells as assembly materials for different types of modules to form corresponding cell groups, thereby providing support for assembly automatically compatible with single-/double-row modules, improving production efficiency, simplifying control logic of the system, saving module storage space, and improving space utilization.

In some embodiments, the cell grouping device includes a cell grouping mechanism and a pressurizing mechanism, where the cell grouping mechanism includes a turntable and a plurality of carrier assemblies distributed on the turntable, and the turntable is configured to drive, through rotation, each carrier assembly to pass through the feeder position, a pressurizing position, and an unloading position in turn, and the pressurizing mechanism is located in the pressurizing position.

Before the separately feeding a first number of cells to a first feeding area and a second feeding area of a feeder position, the cell grouping method may further include the following step S621.

Step S621: Control the turntable to rotate to drive a first carrier assembly located at the unloading position to move to the feeder position, and take a first carrier area of the first carrier assembly as the first feeding area and a second carrier area of the first carrier assembly as the second feeding area.

The foregoing step S602 may include the following steps S622 and S623.

Step S622: Control the turntable to rotate to drive the first carrier assembly to move from the feeder position to the pressurizing position.

Step S623: Under the condition that the first carrier assembly moves to the pressurizing position, control the pressurizing mechanism to laterally pressurize the cells in the first carrier area of the first carrier assembly and the cells in the second carrier area of the first carrier assembly, so as to bring the cells in the first carrier area of the first carrier assembly and the cells in the second carrier area of the first carrier assembly closer to each other in one-to-one correspondence, thereby forming the first number of cell groups.

In some embodiments, the turntable may include a plurality of carrier assemblies evenly distributed along a rotation direction, and an angle for controlling the rotation of the turntable each time can be determined according to the number of the carrier assemblies, so that the turntable can drive, through rotation, each carrier assembly to pass through the feeder position, the pressurizing position, and the unloading position in turn. For example, in the case that the turntable includes three carrier assemblies evenly distributed along the rotation direction, the turntable can be controlled to rotate 120 degrees at a time. In the case that the turntable includes four carrier assemblies evenly distributed along the rotation direction, the turntable can be controlled to rotate 90 degrees at a time.

During implementation, the first carrier assembly can be any carrier assembly on the turntable, without being limited herein. It can be understood that any carrier assembly on the turntable can serve as the first carrier assembly to be rotated and driven through the feeder position, the pressurizing position and the unloading position in turn, and be subjected to corresponding treatment respectively at the feeder position, the pressurizing position and the unloading position.

In this way, through the rotation of the turntable, the plurality of carrier assemblies are driven to pass through the feeder position, the pressurizing position, and the unloading position in turn, so that cell feeding, cell pressurizing and grouping, and cell group unloading can be supported in parallel, thereby reducing production time and improving production efficiency.

In some embodiments, the cell grouping method may further include the following steps S631 and S632.

Step S631: Control the turntable to rotate to drive the first carrier assembly to move from the pressurizing position to the unloading position.

Step S632: Under the condition that the first carrier assembly moves to the unloading position, control the unloading and grabbing device to grab the cell groups in the first carrier assembly to a cell group storage position.

In this way, the unloading operation of the cell groups can be accurately and efficiently completed by the unloading and grabbing device.

In some embodiments, the unloading position includes a first unloading position and a second unloading position, and the unloading and grabbing device includes a first unloading and grabbing mechanism and a second unloading and grabbing mechanism. The foregoing step S631 may include the following step S641.

Step S641: Control the turntable to rotate to drive the first carrier assembly to move from the pressurizing position to the first unloading position and the second unloading position in turn.

The foregoing step S632 may include the following steps S642 and S643.

S642: Under the condition that the first carrier assembly moves to the first unloading position, control the first unloading and grabbing mechanism to grab cell groups located in a first carrier position of the first carrier assembly to the cell group storage position.

S643: Under the condition that the first carrier assembly moves to the second unloading position, control the second unloading and grabbing mechanism to grab the cell groups located in a second carrier position of the first carrier assembly to the cell group storage position, where the first carrier position and the second carrier position in the first carrier assembly are alternately distributed along an arrangement direction of the cell groups.

In this way, the cell groups in the first carrier assembly can be quickly unloaded to the cell storage position by disposing the first unloading position and the second unloading position and using the first unloading and grabbing mechanism and the second unloading and grabbing mechanism to grab the grouped cell groups from the first unloading position and the second unloading position respectively, thereby improving the production efficiency of module assembly. In addition, the first carrier position and the second carrier position in the first carrier assembly are alternately distributed, so a larger operation space can be provided for the first unloading and grabbing mechanism and the second unloading and grabbing mechanism, thereby reducing the space limitations and lowering the control difficulty.

It is pointed out that the foregoing description of each embodiment tends to emphasize the differences between the embodiments, and for the same or similar content, reference may be made between the two circumstances.

It should be understood that references to "one embodiment" or "an embodiment" throughout the specification mean that a particular feature, structure or characteristic related to an embodiment is included in at least one embodiment of this disclosure. Therefore, the appearances of "in one embodiment" or "in an embodiment" in various places throughout the specification do not necessarily refer to the same embodiment. Furthermore, these particular features, structures or characteristics may be combined in any suitable manner in one or more embodiments. It should be understood that in the various embodiments of this disclosure, the sequence numbers of the foregoing steps/processes do not imply the order of execution. The execution sequence of the steps/processes should be determined based on their functions and intrinsic logics, and should not constitute any limitation on the implementation process of the embodiments of this disclosure. The foregoing sequence numbers of the disclosed embodiments are merely for ease of description, and do not indicate different performance of the embodiments.

It should be noted that, as used herein, the terms "include", "comprise", and any variation thereof are intended to cover a non-exclusive inclusion relationship in which a process, method, object, or apparatus that includes or comprises a series of elements not only includes such elements, but also includes other elements not expressly specified or also includes inherent elements of the process, method, object, or apparatus. Without otherwise constraints, an element preceded by "includes a . . . " does not exclude other identical elements in the process, method, object, or apparatus that includes the element.

In the embodiments provided in this disclosure, it should be understood that the disclosed controller and method can be implemented in other ways. The embodiment of the controller disclosed above is merely illustrative. For example, the unit division is merely a type of logic function division, and other division manners may be used in actual implementation. For example, a plurality of units or components may be combined or integrated into another system, or some features may be ignored or skipped. In addition, the mutual coupling, direct coupling or communication connection of various components shown or discussed can be an indirect coupling or communication connection implemented through some interfaces, controllers, or units, and may be in electrical, mechanical or other forms.

The units described above as separate components may or may not be physically separated, and the components displayed as units may or may not be physical units; It can be located in one place or distributed to multiple network units. Some or all of the units can be selected according to actual needs to achieve the purpose of this embodiment. In addition, all the functional units in the embodiments of this disclosure can be integrated into one processing unit, or each unit can be separately used as one unit, or two or more units can be integrated into one unit; the above integrated units can be realized in the form of hardware, or in the form of hardware plus software functional units.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure.

INDUSTRIAL PRACTICALITY

Embodiments of this disclosure at least provide a cell feeding system and method, a cell grouping system and method, and an operation system, which can compatibly provide cells adapted to different types of modules as assembly materials, thus providing support for assembly automatically compatible with single-/double-row modules, improving production efficiency, simplifying control logic of the system, saving module storage space, and improving space utilization.

The invention claimed is:

1. A cell feeding system, comprising a conveyance device and a feeding and grabbing device, wherein the conveyance device comprises a first conveyor line, a second conveyor line, and a third conveyor line, and the feeding and grabbing device comprises a first feeding and grabbing mechanism and a second feeding and grabbing mechanism; wherein the first conveyor line is configured to convey inflowing cells to a first material fetching position;

the second conveyor line is configured to convey inflowing cells to a second material fetching position;

the third conveyor line is configured to convey inflowing cells to a side taping station for side taping treatment, and convey the cells subjected to the side taping treatment to a third material fetching position;

the first feeding and grabbing mechanism is configured to grab a first number of cells from the first material fetching position to a first feeding area in a feeder position; and the second feeding and grabbing mechanism is configured to grab the first number of cells from a target material fetching position to a second feeding area in the feeder position; wherein the target material fetching position is selected from the second material fetching position and the third material fetching position based on a type of a current module to be assembled, and the cells in the first feeding area and the cells in the second feeding area are configured to be grouped in one-to-one correspondence to obtain a first number of cell groups, the cell group comprising two cells with side surfaces opposite each other.

2. The cell feeding system according to claim 1, wherein under the condition that the type of the current module to be assembled is single-row module, the second material fetching position is the target material fetching position; or under the condition that the type of the current module to be assembled is double-row module, the third material fetching position is the target material fetching position.

3. The cell feeding system according to claim 1, wherein the conveyance device further comprises a fourth conveyor line, a fifth conveyor line, and a shunt mechanism, wherein an output end of the fourth conveyor line is connected to an input end of the first conveyor line;

an output end of the fifth conveyor line is connected to the shunt mechanism; and the shunt mechanism is configured to shunt the cells on the fifth conveyor line to the second conveyor line and/or the third conveyor line based on a quantity ratio of single-row modules to double-row modules in at least one module to be assembled.

4. The cell feeding system according to claim 1, further comprising:

a taping mechanism, configured to conduct side taping treatment for the cells on the third conveyor line in the side taping station.

5. The cell feeding system according to claim 4, further comprising:

a detection mechanism, configured to detect the side taping of the cell on the third conveyor line in a detection station to obtain a detection result of the cell; and the third conveyor line is further configured to convey the detected cell to the third material fetching position under the condition that the detection result indicates that the cell is normally taped.

6. A cell grouping system, comprising:

the cell feeding system according to claim 1, configured to separately feed a first number of cells to the first feeding area and second feeding area of the feeder position; and a cell grouping device, configured to group the cells in the first feeding area and the cells in the second feeding area in one-to-one correspondence to obtain a first number of cell groups, wherein the cell group comprises two cells with side surfaces opposite each other.

7. The cell grouping system according to claim 6, wherein the cell grouping device comprises a cell grouping mechanism and a pressurizing mechanism, and the cell grouping mechanism comprises a turntable and a plurality of carrier assemblies distributed on the turntable;

the turntable is configured to drive, through rotation, each carrier assembly to pass through the feeder position, a pressurizing position, and an unloading position in turn; under the condition that the carrier assembly moves to the feeder position, a first carrier area of the carrier assembly serves as the first feeding area, and a second carrier area of the carrier assembly serves as the second feeding area; and the pressurizing mechanism is located at the pressurizing position, and is configured to, under the condition that the carrier assembly moves to the pressurizing position, laterally pressurize the cells in the first carrier area of the carrier assembly and the cells in the second carrier area of the carrier assembly, so as to bring the cells in the first carrier area of the carrier assembly and the cells in the second carrier area of the carrier assembly closer to each other in one-to-one correspondence, thereby forming the first number of cell groups.

8. The cell grouping system according to claim 7, further comprising:

an unloading and grabbing device, configured to grab the cell groups from the carrier assembly to a cell group storage position under the condition that the carrier assembly moves to the unloading position.

9. The cell grouping system according to claim 8, wherein the unloading position comprises a first unloading position and a second unloading position, and the turntable is configured to drive, through rotation, each carrier assembly to pass through the feeder position, the pressurizing position, the first unloading position, and the second unloading position in turn; and the unloading and grabbing device comprises:

a first unloading and grabbing mechanism, configured to grab the cell groups located in a first carrier position of the carrier assembly to the cell group storage position under the condition that the carrier assembly moves to the first unloading position; and a second unloading and grabbing mechanism, configured to grab the cell groups located in a second carrier position of the carrier assembly to the cell group storage position under the condition that the carrier assembly moves to the second unloading position; wherein the first carrier position and the second carrier position in the carrier assembly are alternately distributed along an arrangement direction of the cell groups.

10. An operation system for module assembly, comprising the cell feeding system according to claim 1.

11. A cell feeding method, wherein the method comprises:

controlling a first conveyor line to convey cells flowing into the first conveyor line to a first material fetching position;

controlling a second conveyor line to convey cells flowing into the second conveyor line to a second material fetching position;

controlling a third conveyor line to convey cells flowing into the third conveyor line to a side taping station for side taping treatment, and conveying the cells subjected to side taping treatment to a third material fetching position;

controlling a first feeding and grabbing mechanism to grab a first number of cells from the first material fetching position to a first feeding area in a feeder position; and controlling a second feeding and grabbing mechanism to grab the first number of cells from a target material fetching position to a second feeding area in the feeder position; wherein the target material fetching position is selected from the second material fetching position and the third material fetching position based on a type of a current module to be assembled, and the cells in the first feeding area and the cells in the second feeding area are configured to be grouped in one-to-one correspondence to obtain a first number of cell groups, the cell group comprising two cells with side surfaces opposite each other.

12. The cell feeding method according to claim 11, wherein before the controlling a second feeding and grabbing mechanism to grab a first number of cells from a target material fetching position to a second feeding area in the feeder position, the method further comprises the following step:

selecting, based on the type of the current module to be assembled, the target material fetching position from the second material fetching position and the third material fetching position.

13. The cell feeding method according to claim 12, wherein the selecting, based on the type of the current module to be assembled, the target material fetching position from the second material fetching position and the third material fetching position comprises one of the following:

selecting the second material fetching position as the target material fetching position under the condition that the type of the current module to be assembled is single-row module; and selecting the third material fetching position as the target material fetching position under the condition that the type of the current module to be assembled is double-row module.

14. The cell feeding method according to claim 11, further comprising:

controlling a fourth conveyor line to sequentially convey cells on the fourth conveyor line to the first conveyor line;

determining a quantity ratio of single-row modules to double-row modules in at least one module to be assembled; and controlling, based on the quantity ratio, a shunt mechanism to shunt cells on a fifth conveyor line to the second conveyor line and/or the third conveyor line.

15. The cell feeding method according to claim 14, wherein the controlling, based on the quantity ratio, a shunt mechanism to shunt cells on a fifth conveyor line to the second conveyor line and/or the third conveyor line comprises:

determining an assembly sequence of the at least one module based on the quantity ratio;

traversing the at least one module according to the assembly sequence, and performing the following operations on each module in the traversal process:

selecting a second target conveyor line from the second conveyor line or the third conveyor line based on a type of the module;

controlling the shunt mechanism to flow a second number of cells on the fifth conveyor line into the second target conveyor line, wherein the second number is the number of cell groups to be grouped corresponding to the module;

sequentially determining, according to the assembly sequence, the at least one module as the current module to be assembled; and in a case of an abnormal module with abnormal assembly, inserting a new module with the same model as the abnormal module into at least one module to be traversed in the traversal process.

16. The cell feeding method according to claim 12, further comprising:

controlling the third conveyor line to convey the cells flowing into the third conveyor line to the side taping station;

controlling a taping mechanism in the side taping station to conduct side taping treatment for the cells on the third conveyor line; and controlling the third conveyor line to convey the cells subjected to the side taping treatment to the third material fetching position.

17. The cell feeding method according to claim 16, wherein the controlling the third conveyor line to convey the cells subjected to the side taping treatment to the third material fetching position comprises:

controlling the third conveyor line to convey the cells subjected to the side taping treatment to a detection station;

controlling a detection mechanism in the detection station to conduct side taping detection for the cell on the third conveyor line to obtain a detection result of the cell; and under the condition that the detection result indicates that the cell is normally taped, controlling the third conveyor line to convey the detected cell to the third material fetching position.

18. A cell grouping method, wherein the method comprises:

separately feeding a first number of cells to a first feeding area and a second feeding area of a feeder position by using the cell feeding method according to claim 11; and controlling a cell grouping device to group the cells in the first feeding area and the cells in the second feeding area in one-to-one correspondence to obtain a first number of cell groups, wherein the cell group comprises two cells with side surfaces opposite each other.

19. The cell grouping method according to claim 18, wherein the cell grouping device comprises a cell grouping mechanism and a pressurizing mechanism, wherein the cell grouping mechanism comprises a turntable and a plurality of carrier assemblies distributed on the turntable, the turntable is configured to drive, through rotation, each carrier assembly to pass through the feeder position, a pressurizing position, and an unloading position in turn, and the pressurizing mechanism is located in the pressurizing position;

before the separately feeding a first number of cells to a first feeding area and a second feeding area of a feeder position, the method further comprises:

controlling the turntable to rotate to drive a first carrier assembly located at the unloading position to move to the feeder position, and taking a first carrier area of the first carrier assembly as the first feeding area and a second carrier area of the first carrier assembly as the second feeding area; and the controlling a cell grouping device to group the cells in the first feeding area and the cells in the second feeding area in one-to-one correspondence to obtain a first number of cell groups comprises:

controlling the turntable to rotate to drive the first carrier assembly to move from the feeder position to the pressurizing position; and under the condition that the first carrier assembly moves to the pressurizing position, controlling the pressurizing mechanism to laterally pressurize the cells in the first carrier area of the first carrier assembly and the cells in the second carrier area of the first carrier assembly, so as to bring the cells in the first carrier area of the first carrier assembly and the cells in the second carrier area of the first carrier assembly closer to each other in one-to-one correspondence, thereby forming the first number of cell groups;

controlling the turntable to rotate to drive the first carrier assembly to move from the pressurizing position to the unloading position; and under the condition that the first carrier assembly moves to the unloading position, controlling the unloading and grabbing device to grab the cell groups in the first carrier assembly to a cell group storage position.

20. The cell grouping method according to claim 19, wherein the unloading position comprises a first unloading position and a second unloading position, and the unloading and grabbing device comprises a first unloading and grabbing mechanism and a second unloading and grabbing mechanism; the controlling the turntable to rotate to drive the first carrier assembly to move from the pressurizing position to the unloading position comprises:

controlling the turntable to rotate to drive the first carrier assembly to move from the pressurizing position to the first unloading position and the second unloading position in turn; and the controlling, under the condition that the first carrier assembly moves to the unloading position, the unloading and grabbing device to grab the cell groups in the first carrier assembly to a cell group storage position comprises:

under the condition that the first carrier assembly moves to the first unloading position, controlling the first unloading and grabbing mechanism to grab cell groups located in a first carrier position of the first carrier assembly to the cell group storage position; and under the condition that the first carrier assembly moves to the second unloading position, controlling the second unloading and grabbing mechanism to grab cell groups located in a second carrier position of the first carrier assembly to the cell group storage position, wherein the first carrier position and the second carrier position in the first carrier assembly are alternately distributed along an arrangement direction of the cell groups.

* * * * *